United States Patent [19]

Bonaccio et al.

[11] Patent Number: 4,782,300
[45] Date of Patent: Nov. 1, 1988

[54] DIFFERENTIAL TRANSCEIVER WITH LINE INTEGRITY DETECTION

[75] Inventors: Anthony R. Bonaccio, Colchester, Vt.; Brent A. Carlson, Rochester; Lloyd S. Heim, Oronoco, both of Minn.; Kenneth A. Moe, Los Gatos, Calif.; Steven A. Schmitt, Rochester, Minn.

[73] Assignee: International Business Machines Corporation, Armonk, N.Y.

[21] Appl. No.: 835,674

[22] Filed: Mar. 3, 1986

[51] Int. Cl.⁴ .................. G01R 31/02; H04B 3/46; H04B 17/00
[52] U.S. Cl. .................. 324/509; 324/541; 340/650; 340/652; 371/22; 379/26
[58] Field of Search .................. 324/51, 52, 133, 509, 324/539–544; 340/506, 509, 511, 514, 515, 649–652; 178/69 G; 379/26; 371/22

[56] References Cited

U.S. PATENT DOCUMENTS

| | | | |
|---|---|---|---|
| 3,288,929 | 11/1966 | Hutchinson | 340/652 X |
| 3,377,552 | 4/1968 | Baum | 324/51 |
| 3,671,671 | 6/1972 | Watanabe | 178/68 |
| 3,696,366 | 10/1972 | Parsons | 340/651 |
| 3,700,966 | 10/1972 | Morrow | 340/650 X |
| 3,716,834 | 2/1973 | Adams . | |
| 3,731,203 | 5/1973 | Lieberman | 179/175.31 X |
| 3,737,765 | 6/1973 | Lee et al. | 340/650 X |
| 3,754,221 | 8/1973 | Stelter . | |
| 3,803,355 | 4/1974 | Fiedler et al. | 178/68 |
| 3,825,682 | 7/1974 | Phillips | 178/69 G |
| 3,920,899 | 11/1975 | Riedel et al. | 178/69 G |
| 3,959,605 | 5/1976 | Jurschak | 324/133 X |
| 3,969,711 | 7/1976 | Ahntholz | 340/651 |
| 4,037,050 | 7/1977 | Lefkowitz et al. | 178/69 G |
| 4,178,582 | 12/1979 | Richman | 371/22 |
| 4,408,155 | 10/1983 | McBride . | |
| 4,459,437 | 7/1984 | Gabry et al. | 179/175.3 F |
| 4,529,970 | 7/1985 | Wynne | 340/652 X |

FOREIGN PATENT DOCUMENTS 0013531  1/1982  Japan .................. 371/22

Primary Examiner—Gerald R. Strecker
Attorney, Agent, or Firm—Bradley A. Forrest

[57] ABSTRACT

A differential transceiver transmission line integrity detector detects both open and short circuits in the transmission lines. The two transmission lines are terminated at both ends by selected impedances. A driver coupled to each of the transmission lines drives the lines with data signals. Signal levels on the lines are detected and compared with expected levels to generate line integrity indications. Both open and short conditions are detected and indicated by the line integrity indications.

23 Claims, 3 Drawing Sheets

DIFFERENTIAL TRANSCEIVER WITH LINE INTEGRITY DETECTION

BACKGROUND OF THE INVENTION

1. Field of the Invention

The present invention relates to the detection of signal transmission line integrity on differential signal transmission lines.

2. Prior art

Detection of open circuit and short circuit conditions on differential signal transmission lines has been done by obtaining manual access to the lines and imposing a signal on the lines to check conduction. It has been very difficult to reliably predict faults caused by opens and shorts based on data transmission monitoring as in U.S. Pat. No. 4,178,582 to Richman and U.S. Pat. No. 3,288,929 to Hutchinson. In a differential signal transmission bus, if one of the two transmission lines which are driven by a balanced current source driver and terminated by resistors to DC ground, is operational, at least half of the data signal transmitted is still received.

Such faults seriously degrade the performance of the differential signal transmission lines because they produce intermittent data errors which are hard to trace. The data errors require time to correct, either by error correction code, or retransmission due to parity checks.

Further, more costly alternatives to detect transmission line faults involve automatic superposition of special signals on the lines. A tool has also been used to detect shorts by plugging it into transceivers on the line in various orientations. This tool resulted in different lines being driven and sensed to detect shorts in the lines. This process has proven cumbersome and time consuming. These alternatives add to the cost, and potentially degrade performance.

SUMMARY OF THE INVENTION

A differential transceiver transmission line integrity detector detects both open and short circuits in the transmission lines. The two transmission lines are terminated at both ends by selected impedances. A driving means is coupled to the transmission lines for driving the lines with data signals. A detection means is also coupled to the transmission lines and detects the signal level on the lines and compares the signal with an expected level to generate a line integrity indication.

When one of the two lines in the differential signal transmission bus is in an open circuit condition, one of two parallel terminating resistors is effectively removed from that line. This doubles the impedance from the line to ground, and thus doubles the voltage across the remaining resistor during data transmission. The doubling of the voltage results from the terminating resistors sinking or sourcing a fixed amount of current during data transmission. The doubled voltage is detected by a comparing means on each signal line, which compares the line voltage to a predetermined value and signals an open condition when the line voltage exceeds the predetermined value.

Short circuit conditions ar detected on the differential signal transmission bus by individually driving the lines with selected data signals and simultaneously receiving all signals associated with the bus. By comparing the received signals with expected signals, it is determined which of several short circuit conditions exists.

Line integrity detection is performed without superposition of special signals on the lines, and with higher reliability than monitoring error rates of transmitted signals. Open circuit detection is performed in a diagnostic mode using actual data level transmissions. Open and short circuit detection is performed without operator intervention or physical monitoring of the transmission lines.

Detection of shorts and opens on the differential bus has been a difficult problem that has not been solved in previous systems without service repairperson assistance. Shorts and opens on the bus only reduce the noise tolerance of the bus, resulting in a series of difficult-to-detect intermittent faults caused by random noise. Such faults can seriously degrade bus performance. Through the use of this invention, the cause of such faults can be determined without assistance. Isolation of such faults is also simplified as the fault is characterized as a short or an open, not just as a series of intermittent faults.

DETAILED DESCRIPTION OF THE PREFERRED EMBODIMENT

Figure 1:
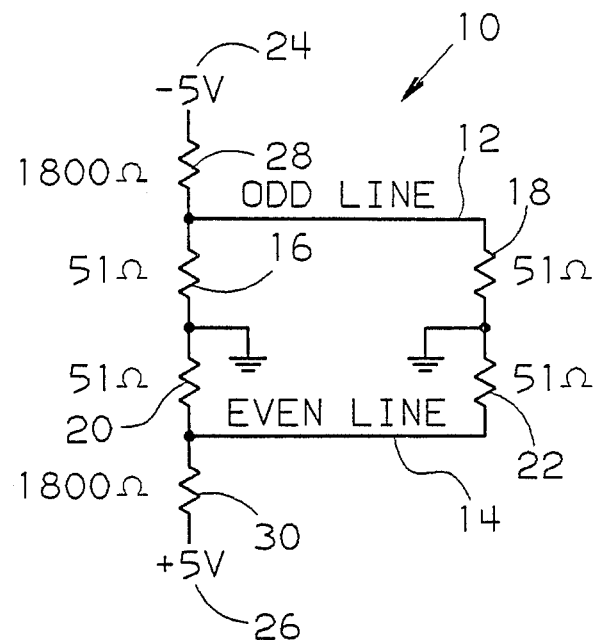
FIG. 1 is a schematic diagram of a differential bus signal pair of transmission lines.

A schematic diagram of a differential bus signal pair of transmission lines is indicated generally at 10 in FIG. 1. An odd line 12 and an even line 14 are coupled to a common potential, preferably ground, at each end through termination impedances 16, 18, 20 and 22. Each line is biased by voltages indicated at 24 and 26. Voltage 24 is preferably $-5$ Volts and is coupled through a biasing impedance 28 to odd line 12. Voltage 26 preferably has a $+5$ Volt value and is coupled to even line 14 through a biasing impedance 30. Since the biasing impedances are much larger than the termination impedances 16 through 22, odd line 12 has a potential slightly negative with respect to common and even line 14 has a potential slightly positive with respect to common. The slight biasing assures adequate noise margins such that no signal is detected as a result of noise.

Figure 2:
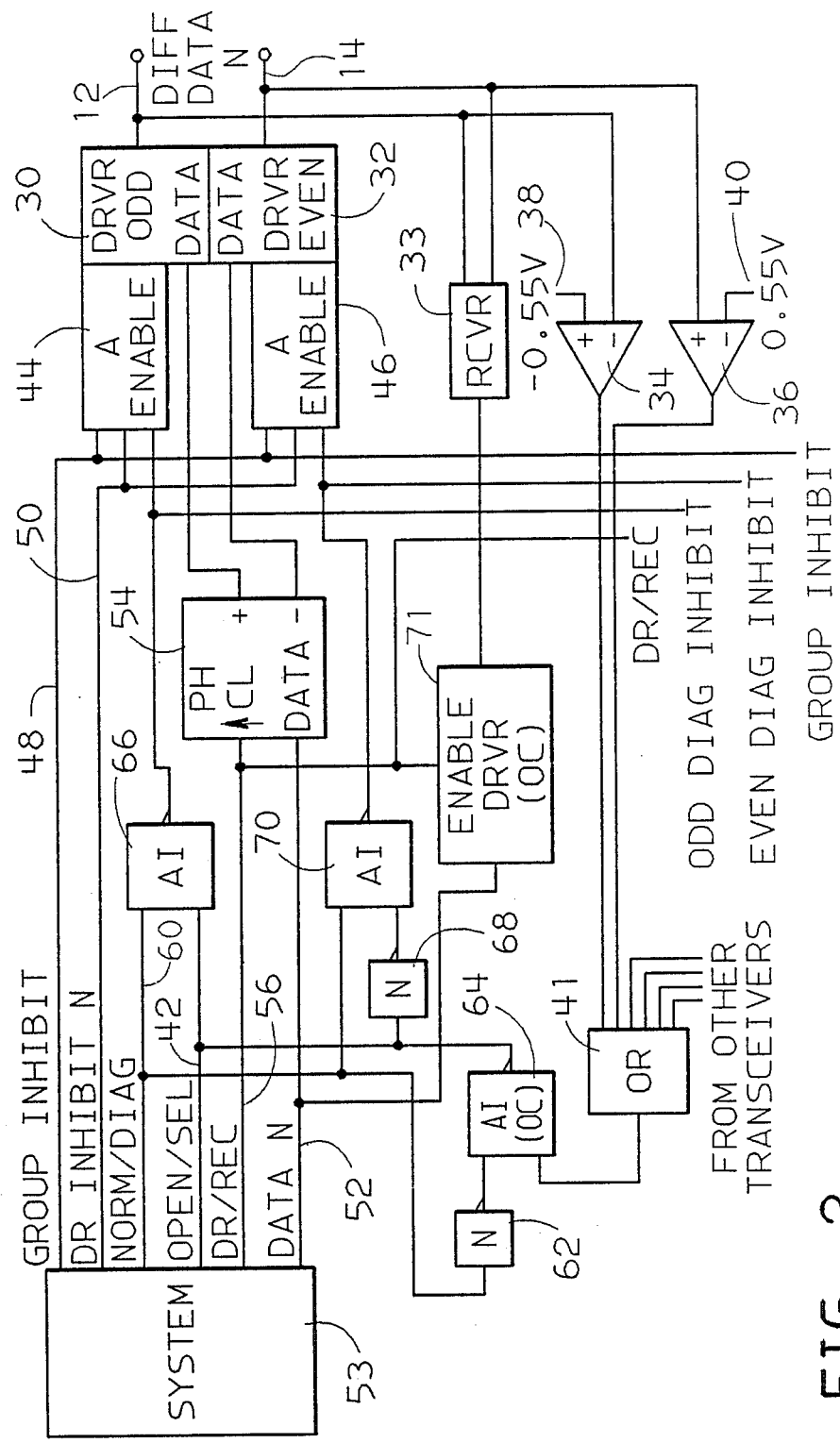
FIG. 2 is a block logic diagram of a transceiver for driving the pair of transmission lines and detecting degraded signal conductive properties in accordance with the invention.

A logic diagram of a transceiver in a differential bus for driving one of three pairs of lines comprising the bus is shown in FIG. 2. Multiple transceivers connect to the lines 12 and 14 in FIG. 1 at different points along the lines. Each transceiver comprises a first driver 30 for driving odd line 12 with predetermined current representative of data to be transmitted. Similarly, a second driver 32 drives even line 14 with predetermined current. A high input impedance receiver 33 is coupled to lines 12 and 14 to receive data from said lines. The transceiver has two modes of operation, normal mode and diagnostic mode. In normal mode, the transceiver acts as a standard balanced differential transceiver, with equal and opposite amounts of current driven out of the drivers, depending upon its logic level.

In the preferred embodiment, a first comparator 34 has inputs coupled to odd line 12 and to a reference voltage of $-0.55$ volts indicated at 38. A second comparator 36 has inputs coupled to even line 14 and to a reference voltage of +0.55 volts indicated at 40. The first and second comparators 34 and 36 detect when the voltage on either line exceeds a predetermined level defined by the respective reference voltages. Exceeding the level is taken to mean that the absolute value of the level increases. These levels maintain the comparator outputs inactive during normal operating conditions. If an open occurs on a line, the voltage on that line roughly doubles due to the effective removal of one of the two parallel termination impedances.

The normal voltage of a line which is driven in the direction of its biasing is approximately −0.3 volts for odd line 12 and +0.3 volts for even line 14. When either of the parallel terminating impedances is removed from a line by a break in the line, the impedance presented to the constant current driver associated with the line is doubled. This causes the voltage on the line to double to −0.6 volts or +0.6 volts when the line is allowed to settle so that reflections of the voltage at the break do not affect the line voltage. Driving each line of the bus in the direction of its biasing allows the current from the biasing impedances and the drivers to add, increasing the voltage level seen at the comparators. It also widens the window between the maximum worst case normal voltage and the minimum worst case open line voltage when all tolerances (power supplies, resistors, drive currents, cable resistances...) are taken into account. The voltages referred to are merely indicative of one embodiment of the invention. Other voltage levels may be used without departing from the spirit of the invention. If a break in the line occurs between a transceiver and the biasing voltage, the comparators 34 and 36 will still detect the open line, but may not have quite as wide a window.

When comparator 34 or 36 detects the doubled voltage, the voltage exceeds the reference and the comparator output becomes active. The comparator outputs are coupled to an OR gate 41, as are the comparator outputs for other lines on the differential bus. The comparator outputs are OR'ed together to cause a signal on a line 42 (Open Sel) to switch, indicating that there is a break in the line.

Driver 30 is coupled to an enable circuit 44, and driver 32 is coupled to an enable circuit 46. Enable circuits 44 and 46 have inputs, lines 48 and 50 which transmit signals labeled Group Inhibit and Dr (driver) Inhibit N respectively. These signals are at a high level for the drivers to drive the lines and thus transmit data. Data is received by the transceiver for transmission from a line 52 (labeled Data N) which is for example coupled to a computer system 53, microprocessor, disk drive controller or the like. Data is first latched from line 52 by a latch 54. Transmission by the drivers 30 and 32 is initiated by a Dr/Rec (driver/receiver) signal provided to latch 54 on a line 56. When Dr/Rec is low, latch 54 is transparent and Data N is passed through to the drivers 30 and 32. The data is latched by a positive transition of Dr/Rec and when Dr/Rec is high, Data N on line 52 becomes the transceiver output.

The drivers may or may not be enabled when the Dr/Rec is high, depending upon the levels of Group Inhibit and Dr Inhibit N. If the drivers are enabled, the transceiver is in wrap-back mode. This mode is useful for dynamic intermittent fault analysis. Since it allows a transceiver to both drive and receive simultaneously, the system 53 driving the bus can check its drivers for intermittent faults. This information can be used in determining the cause of such faults which can seriously degrade bus performance.

Shorts detection takes place in diagnostic mode. A Norm/Diag (normal/diagnostic) signal on a line 60 is set to indicate in which mode the bus is to be operating. When at a high state, the Norm/Diag signal disables the Open/Line Sel indication through Gates 62 and 64, thus disabling the opens detection circuitry. The drivers are now separately controllable, and the Open/Line Sel signal is used to select either of the two line drivers 30 and 32 through gates 66, 68, and 70 and enable circuits 44 and 46. The receiver 33 is permitted by the Dr/Rec signal through a gate 71 to provide data from lines 12 and 14 on line 52.

To detect shorts, data is latched by a positive transition of the Dr/Rec line and the drivers and receivers are enabled by system 53 in the same manner as normal mode. To check the bus for shorts, the following procedure is used. The transceiver is placed in diagnostic mode and each line is individually enabled. During this time the line is alternately sourced and sunk to a steady state by its driver. After the line has settled during each source and sink, all receivers on the bus are checked for abnormal switching by system 53 which places all the transceivers in receive mode.

A shorts detection table indicating detection actions initiated by the system 53 is presented below as Table 1:

TABLE 1

| | SHORTS DETECTION | | |
|---|---|---|---|
| SHORT | SHORT TYPE | DETECTION ACTION | ABNORMAL RESULT |
| line to ground | even line to ground | sink even line | rcvr does not switch |
| | odd line to ground | source odd line | rcvr does not switch |
| line to line, same pair | odd line to even line | sink or source either line | rcvr does not switch |
| | even line to odd line | sink or source either line | rcvr does not switch |
| line 1 to line 2, different pairs | odd line 1 to odd line 2 | source odd line 1 | rcvr 2 switches |
| | odd line 1 to even line 2 | sink odd line 1 | rcvr 2 switches |
| | even line 1 to odd line 2 | source even line 1 | rcvr 2 switches |
| | even line 1 to even line 2 | sink even line 1 | rcvr 2 switches |

If a line has been shorted to ground, the receiver 33 will not switch when the line is driven in the opposite direction on its biasing. If odd line 12 is shorted to ground, the receiver 33 will not switch when current is sourced through the shorted line. By individually sinking and sourcing each line, all shorts on the bus can be detected.

If both lines of a signal pair are shorted together, then the reciever will not switch, or will oscillate. If a line of one signal pair has been shorted to a line of another signal pair, the receiver of one shorted line will switch when the other shorted line is driven in the correct direction (eg, if two negatively biased lines are shorted together, the receivers of both signal pairs will switch when current is sourced through either of the two lines).

In a diagnostic mode, which occurs following a number of errors in trying to send data, or on power on, additional current is sourced or sunk at each driver by logically adding additional driving circuitry. The additional current causes switching when two odd or two even lines are shorted across signal pairs. The biasing of the lines is strengthened in this case because the biasing resistors are placed in parallel, doubling the biasing current. A single current source or sink is unable to overcome this increased biasing. Switching on an additional current source or sink at each driver also increases the noise margin in the line shorted to ground case.

A function table is given in Table 2 below for the circuit of FIG. 2, wherein "x" corresponds to "do not care", "output" corresponds to a line being enabled as output, "diff data (rec)" corresponds to a line being enabled as output from a differential receiver and "inactve" corresponds to a driver neither sourcing nor sinking current.

Lines 12 and 14 are also coupled to comparators indicated as Open Line Detector 90. The detector 90 compares the voltages on lines 12 and 14 to references Vf and −Vf. As described above with respect to opens detection in FIG. 2, if the line voltages exceed its corresponding reference, the open line detector 90 provides a Line Open signal on a line 92.

While the present invention has been described with reference to preferred embodiments, it will be recognized by those skilled in the art that changes to the embodiments may be made to the detection circuitry to arrive at equivalent detection circuits. For example, voltage levels on the transmission lines could be digitized prior to comparison to digitized reference levels.

What is claimed is:

TABLE 2

| −Gr Inh | −Dr Inh | −Dr/ +Rec | −norm/ +Diag | Open/ Line Sel | Data N | Odd Diff Data N | Even Diff Data N |
|---|---|---|---|---|---|---|---|
| low | x | low | low | output | x | inactive | inactive |
| low | x | high | low | output | diff Data (rec) | inactive | inactive |
| high | low | low | low | output | x | inactive | inactive |
| high | low | high | low | output | diff data (rec) | inactive | inactive |
| high | high | low | low | output | low | sink | source |
| high | high | low | low | output | high | source | sink |
| high | high | high | low | output | diff data (rec) | drv lated state | drv lated state |
| low | x | low | high | x | x | inactive | inactive |
| low | x | high | high | x | diff data (rec) | inactive | inactive |
| high | low | low | high | x | x | inactive | inactive |
| high | low | high | high | x | diff data (rec) | inactive | inactive |
| high | high | low | high | low | low | sink | inactive |
| high | high | low | high | low | high | source | inactive |
| high | high | low | high | high | low | inactive | source |
| high | high | low | high | high | high | inactive | sink |
| high | high | high | high | low | diff data (rec) | drv lated state | inactive |
| high | high | high | high | high | diff data (rec) | inactive | drv lated state |

Detection of shorts and opens on the differential bus has been a difficult problem that has not been solved in previous systems without service repariperson assistance. Shorts and opens on the bus only reduce the noise tolerance of the bus, resulting in a series of difficult-to-detect intermittent faults caused by random noise. Such faults can seriously degrade bus performance. Through the use of this invention, the cause of such faults can be determined without assistance. Isolation of such faults is also simplified as the fault is characterized as a short or an open, not just as a series of intermittent faults.

Figure 3:
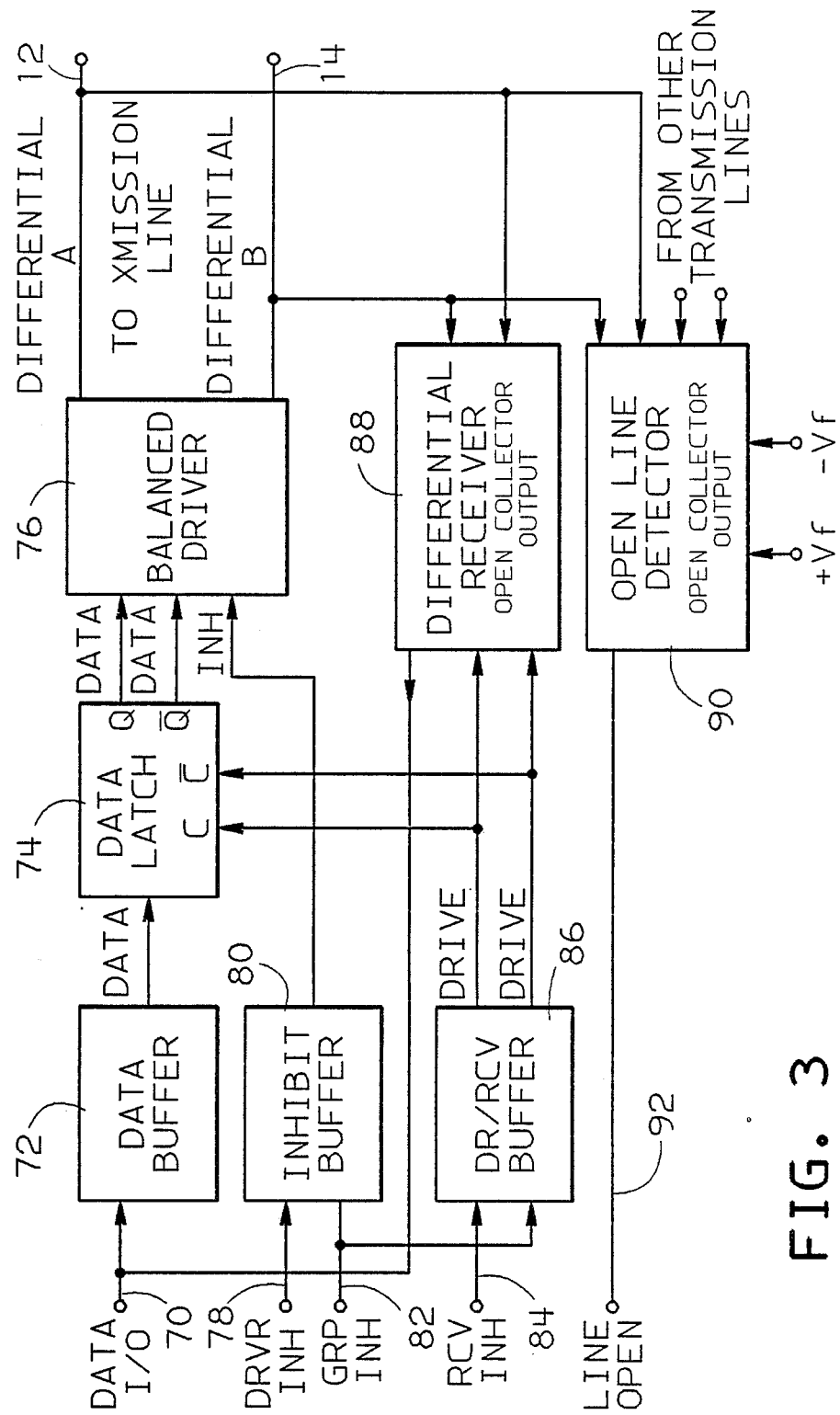
FIG. 3 is a further embodiment of a block logic diagram of a transceiver for driving the pair of transmission lines and detecting open line conditions in accordance with the invention.

A further preferred embodiment of an opens detection circuit is indicated in block diagram form in FIG. 3. Data is input and output from the circuit on a line 70 labeled Data I/0. To transmit data, the data is buffered in a buffer 72, latched by a data latch 74 and driven on lines 12 and 14 (as in FIG. 1) by a balanced driver 76. A Drvr Inh (driver inhibit) signal on a line 78 is supplied to an inhibit buffer 80, as is a Grp Inh (group inhibit) signal on line 82. The Inhibit buffer 80 acts to combine the Grp Inh and Drvr Inh signals to control whether driver 76 is permitted to drive the lines 12 and 14. While Grp Inh is asserted (low), the entire module comprising two differential transceivers is disabled. While Drvr Inh is asserted (low), driver 76 is disabled.

The Grp Inh signal on line 82 is also supplied along with a Rcv Inh (receiver inhibit) signal on a line 84 to a Dr/Rcv Buffer 86. Rcv Inh, when low, disables receiver 88 and allows data present at Data I/0 to be passed through latch 74 to the driver 76. When Rcv Inh transitions to high, the input level present at the Data I/0 line is latched into the module. The output of receiver 88 is then placed on line 70 for reception by a further system similarly coupled thereto and not shown.

1. An open line detector in a differential transceiver having a receiver connected to a pair of transmission lines for receiving data signals on the lines and a transmitter connected to the same pair of transmission lines for transmitting data signals on the lines, each line having predetermined conductive properties, the open line detector comprising:
  first comparing means coupled to a first reference signal and to one of the lines proximate to said transmitter for comparing the data signals on the line to the first reference signal; and
  second comparing means coupled to a second reference signal and to the other one of the lines proximate to said transmitter for comparing the data signals on the line to the second reference signal, wherein a substantial reduction of the data signal conductive properties of at least one of the lines causes the comparator means coupled to said line during transmission of data signals to provide an output signal indicative to said comparisons.

2. The open line detector of claim 1 wherein each transmission line comprises a first end and a second end and wherein the first and second ends of each line are terminated with predetermined impedances.

3. The open line detector of claim 2 wherein the termination impedances are resistors having resistances of approximately equal value.

4. The open line detector of claim 3 wherein the transmission lines are biased with potentials having opposite polarity, said potentials being small compared to the potential of the data.

5. The open line detector of claim 1 wherein the transmitter comprises a pair of balanced drivers coupled to the lines for driving a predetermined current on said lines representative of the data signals.

6. The open line detector of claim 5 wherein each transmission line comprises a first end and a second end and wherein the first and second ends of each line are terminated with resistors having a substantially equal resistance, said resistors providing a parallel resistance between the drivers and a common potential.

7. The open line detector of claim 6 wherein the transmission lines are biased with potentials having opposite polarity, said potentials being small compared to the current across the termination resistors representative of the data signals.

8. The open line detector of claim 7 wherein the first and second reference signals are selected to exceed the potential across the termination resistors when the respective drivers drive the lines in the direction of their biasing.

9. The open line detector of claim 8 wherein the reference signals are selected to not exceed the potential across at least one of the termination resistors when an open condition exists on a line such that the comparing menas coupled to said open line provides the output signal representative of said open condition.

10. A differential transceiver transmission line integrity detector for a differential transceiver having at least one set of two transmission lines for transmission of data, the detector comprising:
   driving means coupled to the transmission lines for selectively driving said lines with data signals; and
   detection means coupled to the transmission lines for detecting the signal level on each of said lines and comparing said signal levels with expected levels to generate a line integrity indication.

11. The integrity detector of claim 10 wherein the driving means comprises a pair of balanced drivers, each coupled to one of the lines for driving a predetermined current on said lines representative of the data signals.

12. The integrity detector of claim 11 wherein the transmission lines are terminated at each end by selected impedances, said impedances comprise resistors having a substantially equal resistance, said resistors providing a parallel resistance between the drivers and a common potential.

13. The integrity detector of claim 12 wherein the transmission lines are biased with potentials having opposite polarity, said potentials being small compared to the current across the termination resistors representative of the data signals.

14. The integrity detector of claim 11 wherein the detection means comprises comparators coupled one to each transmission line to compare the potential across the termination resistors to the expected level.

15. The integrity detector of claim 14 wherein the expected level is selected to not exceed the potential across at least one of the termination resistors when an open condition exists on a line such that the comparing means coupled to said open line provides the reduced conductivity indication.

16. The integrity detector of claim 10 wherein the detection means comprises a differential receiver.

17. The integrity detector of claim 16 wherein the driving means comprises two line drivers independently operably coupled to one each of the set of two transmission lines.

18. The integrity detector of claim 17 wherein each of the line drivers comprises an enable circuit for controlling operability of the drivers independently.

19. The integrity detector of claim 18 wherein the receiver provides an indication of line integrity as a function of independently driving the transmission lines with data.

20. The integrity detector of claim 18 wherein the receiver does not switch when a line which is shorted to a common potential is driven in a direction opposite of its biasing, thus providing an indication that said line is shorted.

21. The integrity detector of claim 18 wherein the differential transceiver comprises multiple sets of transmission lines having corresponding driving means and detection means.

22. The integrity detector of claim 21 wherein the receiver of one set of transmission lines will switch in response to another set of transmission lines when at least one line of each on the two sets of said transmission lines are shorted together and one of the shorted lines is driven in the proper direction.

23. The integrity detector of claim 21 wherein the receiver does not switch in response to either of the lines of one set of lines being driven when said lines are shorted together.

* * * * *